MODULATORS

Filed Sept. 2, 1958 2 Sheets-Sheet 1

INVENTORS
WALTER J. BONIA
JOHN E. OLBRYCH
BY H. Vincent Harsha
ATTORNEY

INVENTORS
WALTER J. BONIA
JOHN E. OLBRYCH
BY H. Vincent Harsha
ATTORNEY 2,946,958

MODULATORS

Walter J. Bonia, Concord, and John E. Olbrych, Salem, Mass., assignors to Raytheon Company, a corporation of Delaware Filed Sept. 2, 1958, Ser. No. 758,253

6 Claims. (Cl. 328—65)

This invention relates to electronic modulator systems for pulsed microwave generating tubes and more particularly pertains to a pulse generator, energizable from a direct current source, employed for furnishing high voltage pulses energizing to a magnetron.

A magnetron, as is well known, is a microwave generating device which may be pulsed into operation by the application of a high voltage between its anode and cathode. Voltage pulses for magnetron operation are usually supplied by a high voltage pulse generator, termed a modulator. It is characteristic of the magnetron that, while a constant load is maintained, if the applied voltage falls very greatly during the pulse, a change in current through the tube will occur causing a change in the magnetron's frequency of oscillation. This phenomenon is known as "frequency pushing" and results in frequency modulation of the magnetron's output. Many uses of a magnetron required that the frequency of the generated microwave energy be maintained within close limits so that frequency modulation is distinctly detrimental. To avoid frequency pushing it is necessary that the voltage applied to the magnetron be a rectangular pulse, or nearly so, with steep front and trailing edges. Thus, in those applications where a pulsed magnetron is required to generate a fixed frequency, the modulator must provide pulses which are relatively free of ripples and in which the rise and fall times are extremely short.

The invention is a simple and effective modulator which is operable from a low voltage direct current source and is adaptable to a wide range of input voltage levels. One section of the modulator acts as an amplifier to step up the input voltage to a higher level. The increased voltage is retained across a storage capacitor. A pulse forming network in the second section of the modulator is arranged to be charged by energy from the storage capacitor. In response to a triggering signal, the network discharges into the primary winding of a pulse transformer causing a high-voltage pulse, developed in the secondary winding, to be applied to the magnetron. During the discharge of the pulse forming network, the storage capacitor is recharged in preparation for the following cycle of pulse operation: The novel modulator provides a pulse output that is singularly free of ripple and the device may be constructed to be independent of the repetition rate at which the magnetron is pulsed. The modulator does not require any inordinately bulky or heavy components and, therefore, is well suited for use in miniature or portable equipment. A subsidiary but important feature of the invention is that it inherently provides a measure of protection for the magnetron after internal arcing has occurred.

The construction of the invention in its manner of operation will be more readily understood by reference to the following description considered in conjunction with the attached drawings in which.

Figure 1:
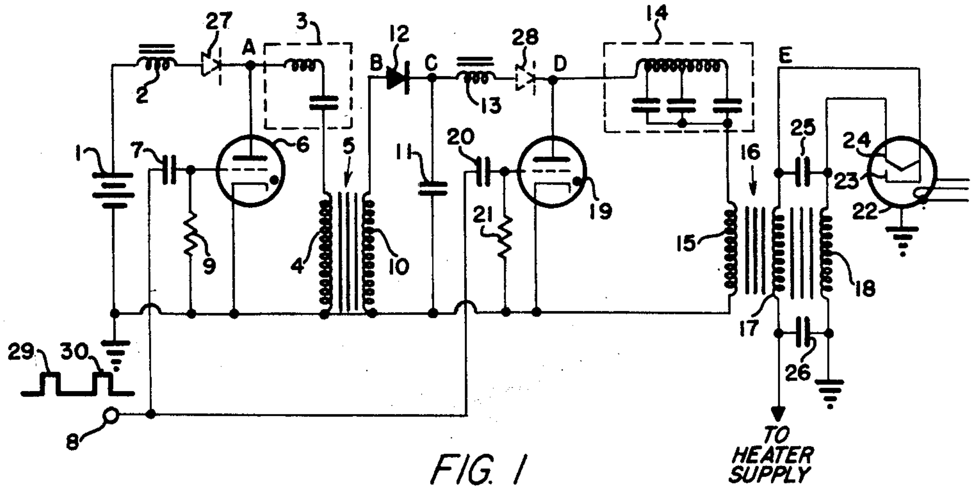
Fig. 1 is a schematic showing of an arrangement embodying the invention.

Referring to Fig. 1 which diagrammatically illustrates one embodiment of the invention, there is shown a low voltage direct current source 1, here depicted as a battery, having its negative terminal grounded and its positive terminal connected to a charging choke 2 which is in turn serially connected to a pulse forming network 3, the pulse forming network being returned to ground through the primary winding 4 of a pulse transformer 5. The pulse forming network is an artificial transmission line composed of lumped inductive and capacitive elements. A gaseous discharge tube 6, preferably of the hydrogen thyratron type, having a control grid, is connected to shunt the serially connected pulse forming network 3 and primary winding 4. The control grid of tube 6 is connected through a coupling capacitor 7 to a terminal 8 at which triggering pulses such as pulses 29 and 30 may be impressed to cause the tube to conduct current. A grid leak resistor 9 is connected between the control grid of tube 6 and ground to insure the grid of tube 6 being returned to ground potential after the conclusion of a triggering pulse. The secondary winding 10 of pulse transformer 5 is shunted by a storage capacitor 11 in series with a diode 12. One plate of the storage capacitor is grounded and the other plate is connected through an inductor or charging choke 13 to a second pulse forming network 14, the pulse forming network being grounded through the primary winding 15 of an output transformer 16 having a secondary winding 17 and 18. The pulse forming network 14 and winding 15 are shunted by a gaseous discharge tube 19, preferably of the hydrogen thyratron type, having its cathode grounded and its plate connected to the pulse forming network 14. A capacitor 20 couples the control grid of tube 19 to terminal 8 and a grid resistor 21 connects that control grid to ground. A magnetron tube 22 is shown having its anode grounded and its cathode 23 connected to secondary winding 17. A bifilar winding 17 and 18 is used in the secondary of transformer 16 so that one grounded heater supply may be utilized for tubes 6, 19, and 22, and so that the stray capacity across the cathode of tube 22 is reduced. This arrangement also insures that the heater 24 of the magnetron shall be at the same RF potential as the cathode. Capacitors 25 and 26 interconnect corresponding points of the bifilar winding 17 and 18 to insure those points being at the same RF potential.

Figure 2:
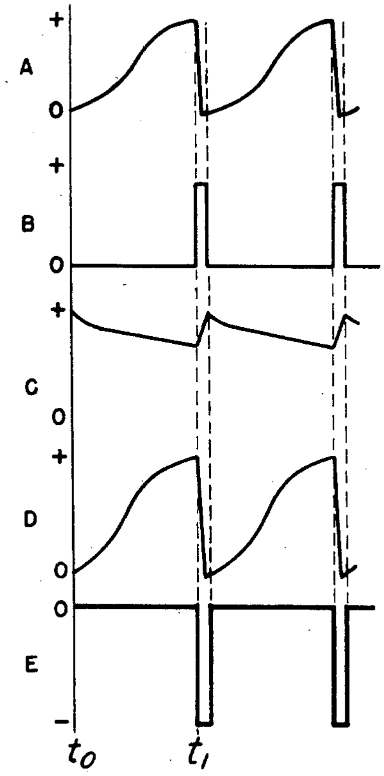
Fig. 2 shows the waveforms appearing at the points designated A through E in Fig. 1.

The operation of the modulator depicted in Fig. 1 will now be described in detail. During the period when tubes 6 and 19 are driven concurrently into conduction by a trigger pulse 29 applied at terminal 8, capacitors 7 and 20 are charged by grid current and upon termination of the trigger pulse, capacitor 7 discharges through resistor 9 and capacitor 20 discharges through resistor 21 causing a negative bias to be applied to the control grids of the tubes. During the interval following the trigger pulse, pulse-forming network 3, an artificial transmission line constituted by inductance and capacitance, is charged from direct current source 1 through choke 2 and primary winding 4 which are connected in series with the network. The charging current is stored by the capacitance of the network and, therefore, a capacitive reactance is offered by the network during the charging period. The inductance of the primary winding 4 and choke 2, which is effectively in series with the capacitance of the network 3, constitute an oscillatory circuit. Referring to Fig. 2 and assuming, for the purpose of exposition, that tube 6 has been triggered into conduction by the trigger pulse 29 sometimes before time $t_0$ so that the energy previously stored in network 3 has discharged through tube 6 into primary winding 4, the potential at point A will be nearly zero, i.e., ground potential, due to the low voltage drop in the gas tube 6. Because tube 6, upon the termination of the network's discharge, rapidly returns to its non-conductive state, the voltage of source 1 is suddenly applied to the complete oscillatory circuit. That sudden change of voltage tends to set up a train of oscillations and the initial surge of energy oscillates between the magnetic field around the inductors and the charge on the capacitor. Since the inductance of choke 2 greatly exceeds the inductance of the primary winding 4, the magnetic energy will be stored largely in the field about the choke. If there were no resistance in the oscillatory circuit comprised by the choke 2, network 3, and primary winding 4, the current would be an undamped sine wave, and the voltage at point A would vary between zero and twice the applied voltage. However, with resistance inevitably present in the circuit, the voltage at point A is a damped sine wave which will, unless arrested, ultimately die out, leaving the capacitance in the pulse-forming network charged to the potential of the source. As a practical matter, the damping caused by the resistance in the circuit limits the first swing of voltage at point A to something less than twice the source voltage. The total inductance in the circuit is selected to make the frequency of oscillation equal to one-half the pulse repetition frequency of the magnetron so that the voltage at point A is a maximum at time $t_1$, as shown in Fig. 2A, at which moment the tube 6 is triggered into conduction causing the voltage at point A to drop toward ground potential and causing pulse-forming network 3 to commence discharging through the primary winding 4 of transformer 5. The impedance of choke 2 is so very much greater than the impedance of the primary winding 4 that the choke 2 is effectively an open circuit during the discharge of network 3. Although not in any way critical, the impedance looking into primary winding 4, for best results, is matched as closely as possible to the characteristic impedance of network 3 so that nearly half the voltage across the capacitance of the network at time $t_1$ is produced across the primary winding 4. When it is desired to be able to adjust the pulse repetition rate over appreciable ranges, a diode 27, here indicated in phantom, is connected in the circuit to prevent the initial swing of voltage from decreasing much below its peak value. The diode permits current to flow in the direction for charging the network, but when the current attempts to reverse direction, the diode becomes nonconducting and prevents any appreciable change in the charge on the network 3. By this means, the network 3 can be charged to nearly twice the applied voltage, and will, due to the diode 27, essentially remain at this voltage until tube 6 conducts, so that it is not necessary to synchronize the firing of the tube with the period of the charging oscillation. Triggering of tube 6 causes the network 3 to discharge through tube 6 and winding 4, producing a negative pulse at the primary winding of transformer 5 which is inverted and stepped up in voltage at the secondary 10. The positive voltage pulse induced in the secondary winding is shown in Fig. 2B and the pulse causes a current to flow through diode 12 which rapidly charges storage capacitor 11. The waveform shown in Fig. 2C demonstrates the extremely rapid charging of the storage capacitor. During the interpulse interval, capacitor 11 discharges relatively slowly into pulse forming network 14. The choke 13 and primary winding 15 in series with network 14 constitute an oscillatory circuit and resonant charging of network 14 (Fig. 2D) is employed to make the voltage across the capacitance of network 14 approximately twice the voltage across storage capacitor 11. A diode 28, here indicated in phantom, may be employed to prevent the initial swing of voltage from decreasing from its maximum value. Tubes 6 and 19 are triggered concurrently so that the storage capacitor recharges at the time pulse forming network 14 is discharging through primary winding 15 of transformer 16. The discharge of network 14 into winding 15 causes a stepped up negative pulse to be induced across secondary winding 17 and 18. The voltage pulse applied to the magnetron is completely free of the effects of ripple across storage capacitor 11. Fig. 2E shows the waveform of the negative pulse that is delivered to the magnetron. For a model which was tested, the waveform of Fig. 2C represented a peak to peak ripple factor of ten percent, yet the magnetron current pulse was perfectly stable and the frequency spectrum was free from frequency modulation. The value of capacitance chosen for storage capacitor 11 is not critical, the lower limit being governed by the loss of voltage during charging of pulse-forming network 14 which can be tolerated.

The storage capacitor 11 in Fig. 1 is of such value that its impedance is relatively high, affording a measure of protection to the magnetron after the occurrence of an arc. Arcing in a magnetron occurs where the voltage pulse applied between the anode and cathode becomes too high. When arcing takes place in the magnetron, a negative charge across pulse forming network 14 results, causing the storage capacitor 11, on the next charging cycle to discharge into the network at a higher rate due to the increased differential in voltage, which tends to lower the voltage of the storage capacitor and, therefore, stabilizes the charge stored in network 14 at a safe level.

Figure 3:
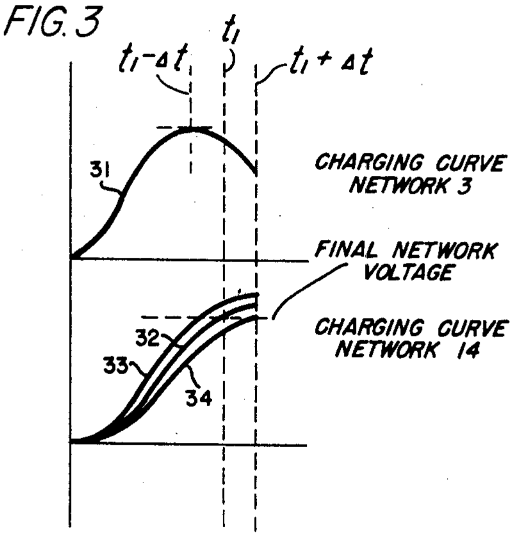
Fig. 3 depicts charging curves for the pulse forming networks employed in the embodiment of Fig. 1.
Figure 4:
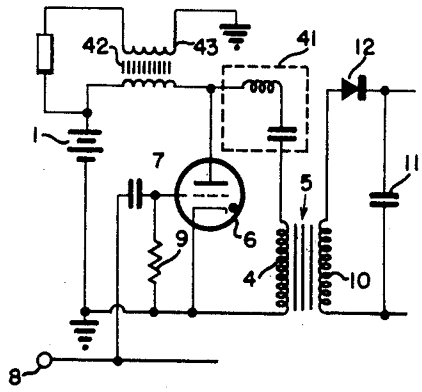
Fig. 4 illustrates a modification of the invention which compensates for variations in the voltage at source 1.

The output of the modulator shown in Fig. 1 can be made independent of moderate changes in the repetition rate of the triggering signals by the simple expedient of placing hold-off diodes 27, 28 between the charging choke and the thyratron tube in each section of the device. In lieu of employing hold-off diodes, the same result can be achieved through adjusting the time constant in the charging circuits of the pulse forming network so that one network charges to its peak voltage before the occurrence of the trigger and the other network charges to less than its peak voltage when the trigger occurs. This can be better understood by reference to Fig. 3 where the curve 31 represents the charging of network 3 and curve 32 represents charging of network 14 when the trigger occurs at the time $t_1$. The conditions demonstrated in Fig. 3 assume that the triggering pulse normally occurs at time $t_1$ and that a maximum time variation $\Delta t$ can be expected in the trigger's occurrence due to a change in triggering rate. The earliest triggering pulse will, therefore, occur at $t_1-\Delta t$ and the latest triggering pulse at $t_1+\Delta t$. If the triggering rate is increased so that the trigger pulse occurs earlier, that is a time $t_1-\Delta t$, network 3 charges to its peak value causing a higher voltage to appear across capacitor 11, which in turn causes the network 14 to charge along curve 33, which represents a faster charging rate and results in the network 14 attaining the same final network voltage which it would have had if the trigger had occurred at the time $t_1$. Similar reasoning applies for the lower repetition rate where the trigger pulse occurs at time $t_1+\Delta t$. In this latter case the charge on network 3 is something less than the peak voltage because the initial voltage swing, due to the late trigger, has time to decrease whereby the capacitor 11, upon the occurrence of the trigger is charged to a lower voltage which in turn causes the network 14 to charge along curve 34 and results in the network being charged to the same final voltage since the charging time for the network 14 has been increased, permitting a lower charging voltage on capacitor 11.

Where the direct current source 1 is expected to fluctuate in voltage to such an extent that frequency pushing of the magnetron can occur, regulation of the supply voltage at a value below the lower limit of fluctuation may be provided. This method, while effective, is wasteful of power and lowers the voltage which would be available in the absence of regulation. A solution which avoids regulating the voltage of source 1 is shown in Fig. 4 which depicts a modification of the circuitry shown in Fig. 1 and wherein only those components which have been modified or added are designated by different numerals. It will be observed that the resonant charging circuit for the pulse forming network 41 includes the primary winding 4 of transformer 5 and a charging reactor 42 of the saturable-core type having a D.C. control winding 43. The resonant charging circuit is adjusted so that at the nominal voltage of source 1, the initial swing of the charging voltage passes beyond its peak value at the time $t_1$ when the triggering pulse occurs which fires the tube 6, as shown by the curve 54 in Fig. 5. The D.C. control winding 43 is connected in series with an element (which may be either linear or non-linear) across the source 1 such that the inductance of the reactor 42 increases as the supply voltage decreases. When the supply voltage decreases, therefore, the network 41 charges at a lower rate along the curve 55 in Fig. 5 with the result that the final charge on the network reaches the same value regardless of the fluctuation of the supply voltage.

Figures 5, 6:
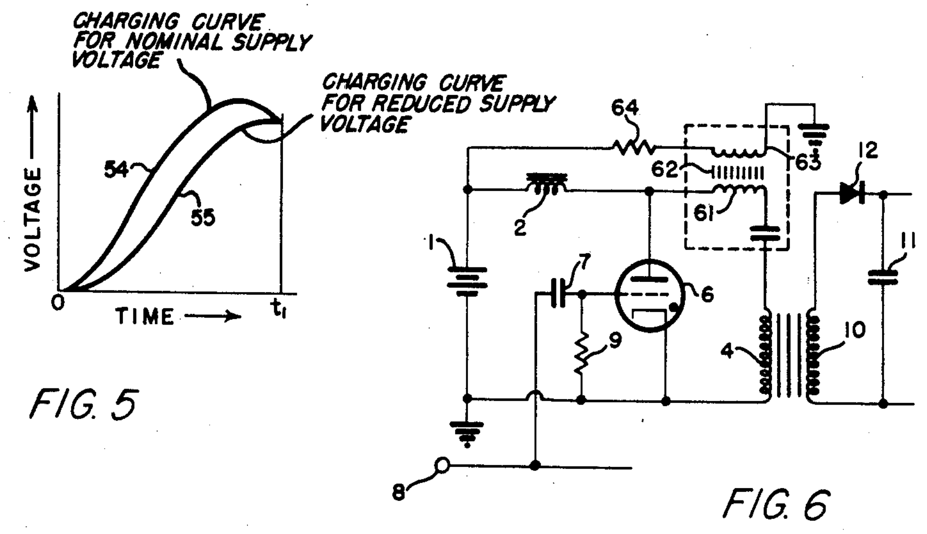
Fig. 5 shows charging curves pertaining to the pulse forming network 41 in Fig. 4.
Fig. 6 illustrates another modification of the invention for compensating for variations in supply voltage.

An analogous, but somewhat simpler and more direct scheme for compensating for fluctuations in the voltage of the source 1, is illustrated in Fig. 6. The circuit of Fig. 1 has been modified to utilize the inductance of pulse forming network 3 as the control mechanism. This has been accomplished by placing the inductive winding 61 of the network 60 on a suitable saturable core 62 having a D.C. control winding 63 connected in series with a current limiting element, here indicated as a resistor 64, across the supply source 1. It was found with the arrangement shown in Fig. 1 that energy transferred from the network 3 to the storage capacitor 11 was dependent upon the width of the pulse delivered and the magnitude of the supply voltage. That is, with a high value of supply voltage a narrow pulse could be delivered, and with a lower value of supply voltage, the same amount of energy transfer into the storage capacitor could be accomplished by making the pulse width wider. Since the width of the pulse is a function of the inductance in network 3, by varying the inductance in the network the amount of energy transferred into storage capacitor 11 can be changed. In the arrangement shown in Fig. 6 the current flowing in the D.C. control winding 63 is dependent upon the voltage at source 1 so that the inductance and the pulse width will increase as the supply voltage falls off, maintaining the same amount of energy transfer into the storage capacitor 11.

This invention is not limited to the particular details of construction described, as many equivalents will suggest themselves to those skilled in the art. It is, accordingly, desired that the appended claims be given a broad interpretation commensurate with the scope of the invention within the art.

What is claimed is:

1. A modulator for pulsing a magnetron comprising a pulse forming first network connected in series with the primary winding of a pulse transformer, a first choke inductor, means for resonantly charging said first network through said first choke, a normally open first electronic switch connected to said first network, means for causing said first switch to close in response to a triggering signal whereby said first network discharges through said primary winding, a storage capacitor connected across the secondary winding of said pulse transformer, a pulse forming second network connected in series through a normally open second electronic switch to the primary winding of an output transformer, a second choke inductor interconnecting said storage capacitor and said second network, means for causing said second switch to close in response to said triggering signal to cause said second network to discharge through the primary winding of said output transformer, and means for deriving an output pulse from the secondary winding of said output transformer.

2. A modulator for pulsing a magnetron comprising a first resonant circuit including a pulse forming first network connected to the primary winding of a pulse transformer and a charging choke, a normally open first electronic switch connected between said first network and said primary winding, said first switch being adapted to close in response to a triggering signal to cause said network to discharge through said primary winding, a storage capacitor connected to the secondary winding of said pulse transformer and adapted to be charged therefrom, means for preventing said capacitor from discharging through said secondary winding, a pulse forming second network connected in series through a normally open second electronic switch to the primary winding of an output transformer, a choke interconnecting said storage capacitor and said second network whereby said second network is charged from said storage capacitor, means for causing said second switch to close in response to said triggering signal to cause said second network to discharge through the primary winding of said output transformer, and means for deriving an output pulse from the secondary winding of said output transformer.

3. A modulator for pulsing a magnetron comprising a direct current energizing source, a first resonant circuit connected across said source, said circuit including a first pulse forming network serially connected to a charging choke and the primary winding of a pulse transformer, a gaseous discharge tube connected to said first network, means for causing said tube to conduct in response to a triggering signal whereby said first network discharges through said primary winding of said pulse transformer, a storage capacitor connected across the secondary winding of said pulse transformer whereby said capacitor is charged, means for preventing said capacitor from discharging through the secondary winding of said pulse transformer, a second resonant circuit connected across said capacitor, said second circuit including a second pulse forming network serially connected to a charging choke and the primary winding of an output transformer, a second gaseous discharge tube connected to said second network, means for causing said second tube to conduct in response to said triggering signal to cause said second network to discharge through the primary winding of said output transformer, and means for deriving an output pulse from the secondary winding of said output transformer.

4. A modulator for pulsing a magnetron comprising a source of charging current, a first resonant circuit connected across said source, said circuit including a first pulse forming network serially connected to a charging choke and the primary winding of a pulse transformer, means in said first circuit for preventing the charging voltage from decreasing below its peak value, a gaseous discharge tube shunting said first network and its associated primary winding, said tube having a control grid for causing said tube to conduct in response to a triggering signal to cause said first network to discharge through said associated primary winding, a storage capacitor and a diode serially connected to the secondary winding of said pulse transformer whereby said capacitor is charged from and prevented from discharging through said secondary winding, a second resonant circuit connected across said capacitor, said second circuit including a second pulse forming network in series with a charging choke and the primary winding of an output transformer, means in said second circuit for preventing the charging voltage from decreasing below its peak value, a second gaseous discharge tube shunting said second network and its associated primary winding, means for causing said first and second tubes to conduct concurrently, and means for deriving an output pulse from the secondary winding of said output transformer.

5. A modulator for pulsing a magnetron comprising a source of charging current, a first resonant circuit connected across said source, said circuit including a pulse forming network connected to a saturable reactor and the primary winding of a transformer, said reactor having a control winding connected to said source through a non-linear element whereby the inductance of said reactor is caused to vary as a function of the voltage at said source, a normally open first electronic switch shunting said network and said primary winding, a storage capacitor connected across the secondary winding of said transformer, a second resonant circuit connected across said capacitor, said second network including a second pulse forming network connected to a choke and the primary winding of an output transformer, a normally open second electronic switch shunting said second network and the primary winding of said output transformer, means for concurrently causing said first and second switches to close in response to a triggering signal, and means for deriving an output pulse from the secondary winding of said output transformer.

6. A modulator for pulsing a magnetron comprising an energizing source, a first resonant circuit connected across said source, said resonant circuit including a first pulse forming network having a control winding associated therewith for varying the inductance of said network in response to changes in voltage at said source, a normally open electronic switch connected between said first network and the primary winding of a pulse transformer, means for causing said first switch to close in response to a triggering signal to cause said network to discharge through said primary winding, a storage capacitor connected to the secondary winding of said pulse transformer, means for preventing said capacitor from discharging through the secondary winding of said pulse transformer, a second resonant circuit connected across said capacitor, said second circuit including a second pulse forming network serially connected to the primary winding of an output transformer, a normally open electronic switch shunting said second network and the primary winding of said output transformer, means for causing said second switch to close concurrently with said first switch to cause said second network to discharge through its associated primary winding, and means for deriving an output pulse from the secondary winding of said output transformer.

References Cited in the file of this patent

UNITED STATES PATENTS

| | | |
|---|---|---|
| 2,693,532 | Krienen | Nov. 2, 1954 |
| 2,743,360 | Stanton et al. | Apr. 24, 1956 |

FOREIGN PATENTS

| | | |
|---|---|---|
| 722,694 | Great Britain | Jan. 26, 1955 |